United States Patent [19]

Wise

[11] Patent Number: 4,539,843

[45] Date of Patent: Sep. 10, 1985

[54] ALTIMETER AND VERTICAL SPEED INDICATOR

[75] Inventor: Fred W. Wise, Windsor, Pa.

[73] Assignee: Aerologic, Inc., Windsor, Pa.

[21] Appl. No.: 558,383

[22] Filed: Dec. 5, 1983

[51] Int. Cl.³ .................... G01C 21/10; G01L 7/12
[52] U.S. Cl. ........................................ 73/179; 73/384
[58] Field of Search ............ 73/387, 386, 384, 179; 340/27 AT

[56] References Cited

U.S. PATENT DOCUMENTS

| | | | |
|---|---|---|---|
| 2,718,783 | 9/1955 | Anastasia | 73/179 |
| 3,098,381 | 7/1963 | Little | 73/179 |
| 3,545,269 | 12/1970 | Sherbert, Jr. | 73/179 |
| 3,572,115 | 3/1971 | Feuer | 73/179 |
| 3,726,138 | 4/1973 | Kosakowski | 73/179 |
| 3,958,108 | 5/1976 | Shimomura | 73/384 |
| 3,958,459 | 5/1976 | Shimomura | 73/384 |
| 3,961,272 | 6/1976 | Witriol | 73/179 |
| 4,027,143 | 5/1977 | Witriol | 73/384 |
| 4,047,001 | 9/1977 | Witriol | 73/384 |
| 4,086,810 | 5/1978 | Ball | 73/179 |
| 4,106,343 | 8/1978 | Cook | 73/387 |
| 4,135,403 | 1/1979 | Skarvada | 73/384 |
| 4,292,671 | 9/1981 | Evans | 73/384 |

FOREIGN PATENT DOCUMENTS 0098321 1/1984 European Pat. Off. ............. 73/387

Primary Examiner—Donald O. Woodiel
Attorney, Agent, or Firm—Martin Fruitman

[57] ABSTRACT

A combination altimeter and vertical speed indicator using digital displays. Digital logic technique are used to calculate vertical speed, eliminate drift in the vertical speed zero indication, correct vertical speed readings for altitude, and display altitude below zero. An automatic reading of barometric pressure setting for use as an offset is furnished at turn-on to permit initial setting of the instrument. Power to the instrument is pulsed to reduce consumption and permit long term battery operation.

22 Claims, 2 Drawing Figures

ALTIMETER AND VERTICAL SPEED INDICATOR

SUMMARY OF THE INVENTION

This invention deals generally with measuring and testing and more specifically with an instrument which combines the display of altitude and vertical speed.

The recent rise to popularity of ultralight recreational aircraft has placed a whole new set of requirements upon aircraft instrumentation. While most aircraft instrument development has been focused on more sophisticated parameters and more complex instruments, the need of the recreational aircraft operator is for simpler, smaller and lighter instruments. Power consumption, which has no limitation whatsoever on most flight instruments, becomes a prime consideration for recreational aircraft where every ounce of weight is also an important concern.

Traditional instruments are, therefore, unsuitable for recreational aircraft, and what are generally required are lightweight, low power consumption, small units. Accuracy remains an important goal, and, since many recreational aircraft operators are new to the experience of flying, simplicity of operation is vital to an instrument which is to be used on such aircraft.

Prior art altitude instruments have been largely dependent upon aneroid wafers which use mechanical linkages to amplify small changes at the wafer into greater movements of the instrument needle. This mechanical amplification requires that vibration be induced into the instruments to assure they would move freely, but also makes them subject to error by extraneous vibration caused by the aircraft movement and engines.

The present invention completely discards the former mode of operation and instead uses a solid state pressure transducer to generate an electrical signal. The result is a system with no moving parts, and with little susceptibility to vibration induced error.

The present invention is a combination altimeter and vertical speed indicator which meets all the criteria of a suitable instrument for ultralight aircraft by using digital signal processing. Moreover, it maintains accuracy by providing the capability for simple resetting of the barometric pressure compensation of altitude each time the instrument is turned on. To conserve power, the instrument is actually operated with pulsed power for a part of the electronic circuit so that the power source, typically an external battery, is not quickly discharged.

In the present invention, the altitude is initially read as a barometric pressure by a temperature compensated semi-conductor pressure sensor. After amplification, the analog signal generated by the sensor is fed to a transistor switch which, upon command, selects either the sensor signal or a user settable reference voltage which represents the barometric offset to be forwarded to an analog to digital (A/D) converter circuit. This A/D converter converts either of these two voltages selected into digital form which can then be processed by conventional digital signal techniques in the next circuit stage, a digital processor. This processing is controlled to vary with the signal selected.

For instance, when the user settable reference voltage is selected to be forwarded to the A/D converter, the digital processor factors the D.C. voltage fed to it to produce a numerical value equivalent to a desired barometric setting in appropriate units. This signal is forwarded to a display which activates the altitude indicator to display digital numbers equivalent to the appropriate barometric pressure setting.

When the other choice, the sensor signal, is forwarded to the A/D converter, the signal processing is more elaborate. The sensor signal is then processed to derive two readings, one for altitude and one for vertical speed.

The altitude reading is secured by averaging two readings taken in quick succession and factoring the result, the average sensor voltage, originally a value proportional to barometric pressure, to yield a numerical value which is a linear function of altitude. After undergoing further processing to compensate for the previously described barometric setting this value is forwarded to the digital driver and then to the altitude indicator for visual display.

The sensor voltage is also processed to yield the vertical speed reading. The processor stores a first average of the two sensor readings sampled for the altitude display. Then, after a fixed time delay, it stores a second average and after another fixed time delay, it processes a third average of two altitude readings, takes the difference between the readings, and, using the time period between the readings, computes a rate of change and factors it to a numerical value representing feet per minute which is displayed, via the digital driver, on the digital indicator for vertical speed.

The fixed time delay for the rate of change reading is supplied by a timer which determines the sample rate, and in order to conserve battery power, this same period is used for control of other portions of the circuit. Since no readings are required between the presented samples, a transistor switch is used to cut power to the sensor. Allowing an appropriate time for the actual signal processing and including a "settling in" period when the power is first applied, permits the high power sensor portion of the circuit to be operated at a duty factor of less than ten percent and thereby dramatically reduces power consumption.

Typically, the sample period is less than two seconds which is such that there is very little physiological perception of delay of the readings. With a two second sample period it takes no more than 4 seconds from the beginning of a rate change before the vertical speed is displayed on the indicator.

In actual operation the altitude and vertical speed readings are simultaneously displayed on the indicators at all times with new readings occuring approximately every two seconds, and the barometric pressure setting being displayed automatically only at turn-on of the instrument. Subsequently, barometric settings may be checked by turning the instrument off and then on again.

When turned on, the instrument automatically switches to reading the barometric pressure setting for a preset time, typically 15 seconds. This gives the operator sufficient time to use the potentiometer control associated with the selector to set the instrument to the known barometric pressure of the locality at that time, thus "zero" setting the instrument before use.

Two other "zero" setting methods are also available. One is to set the instrument, using the same potentiometer control to read the altitude of the site at which the aircraft is located. This is accomplished merely by waiting until the instrument automatically switches to altitude reading after turn-on, and to adjust the control until the appropriate altitude is displayed.

The second method is to similarly adjust the altitude reading after turn-on, but to adjust it to display zero when the aircraft is at the take-off site. This method gives the advantage of the instrument directly reading the height above ground, which is a distinct advantage since it eliminates the need to subtract the altitude at the airport to secure that vital information from the instrument when in flight.

The result of setting the instrument at zero altitude at the airport is to furnish the operator, even the inexperienced one, an accurate indication of the altitude above ground from a single, reliable, dual-purpose instrument which operates for up to 50 hours on a 9 volt transistor battery.

The instrument also has the capacity to display altitudes below zero as indicated by a minus sign. This facilitates setting at exactly zero and permits referencing the flight to two different landing sites when one is at lower altitude than the other.

DETAILED DESCRIPTION OF THE INVENTION

Figure 1:
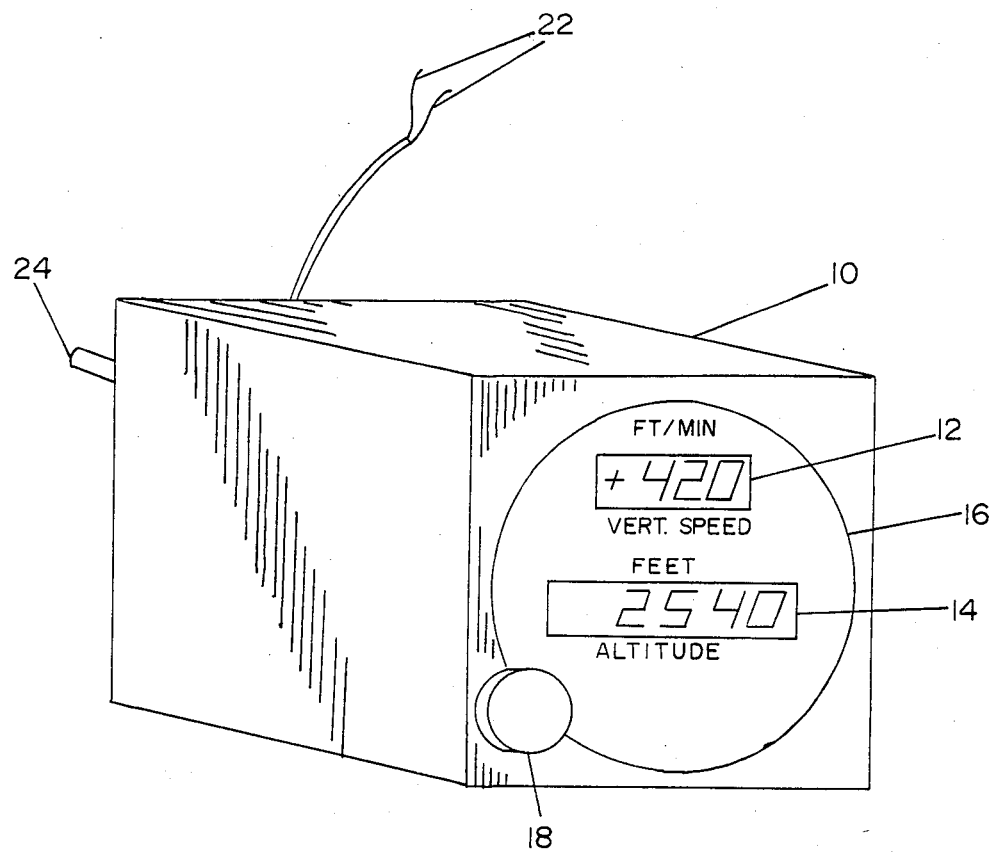
FIG. 1 is a perspective view of the preferred embodiment of the invention.

The mechanical configuration of the preferred embodiment of the invention is shown in FIG. 1 where instrument 10 includes both vertical speed indicator 12 and altitude indicator 14 on its front face 16. Adjustment knob 18 is connected to an internal potentiometer 20 (FIG. 2) and wires 22 are used to connect instrument 10 to a power source, typically a battery (not shown). Pressure sensor port 24 is an open tube which assures access of the internal pressure sensor to atmospheric pressure.

Figure 2:
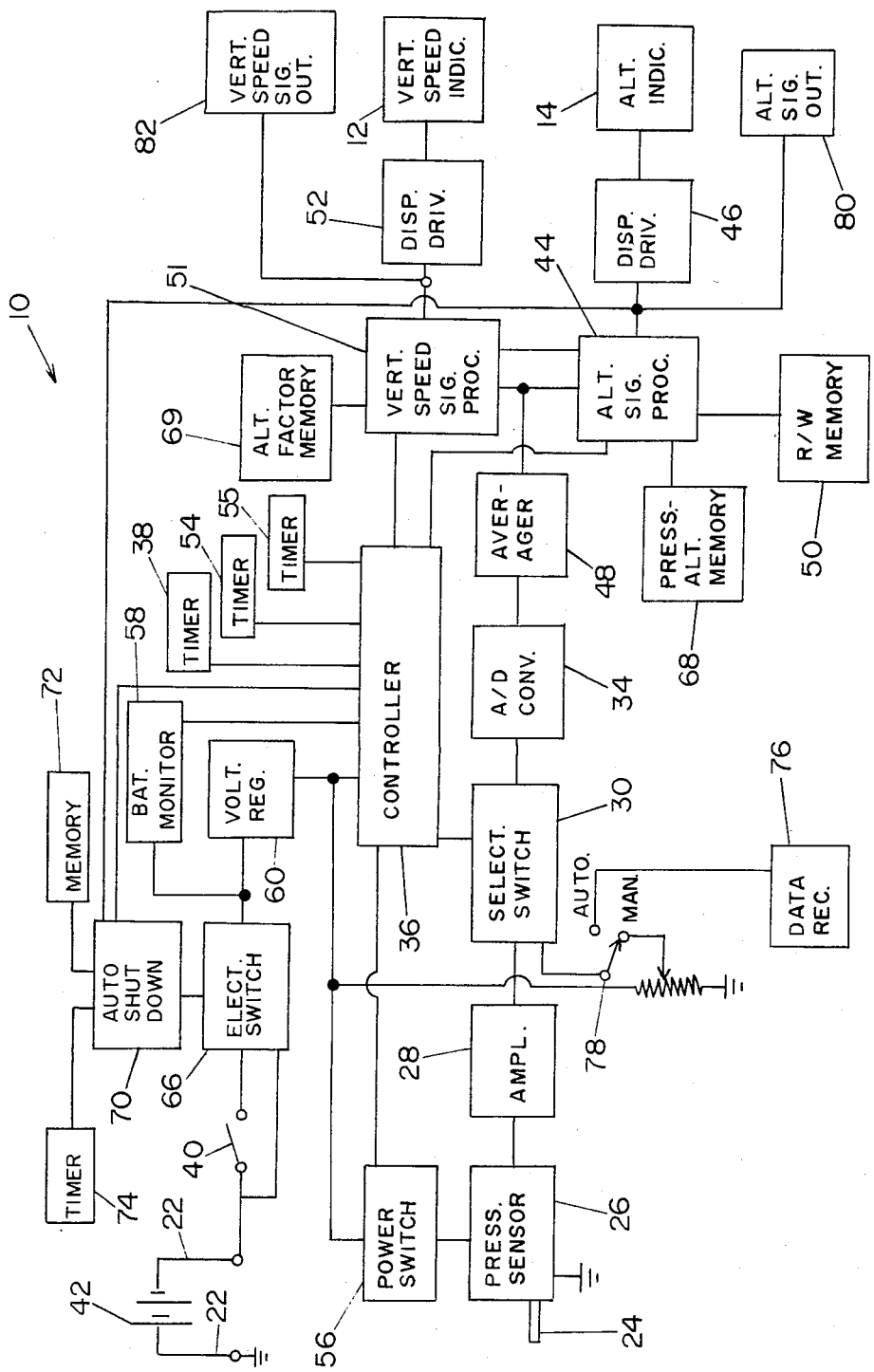
FIG. 2 is a simplified block diagram of the electronic circuit of the preferred embodiment of the invention.

FIG. 2 is a simplified block diagram of the electronic circuit of the invention. The particular functional blocks depicted consist of conventional circuits and components well known to those skilled in the art, but the combination of these circuits described here results in a unique dual-purpose instrument which is particularly suited for the requirements of ultralight aircraft.

The heart of instrument 10 is semiconductor pressure sensor 26. This device produces an output D.C. voltage which varies proportional to pressure. The pressure sensor selected for the preferred embodiment is temperature compensated, that is its output is independent of temperature.

The signal from sensor 26 is amplified by amplifier 28. The amplifier in the preferred embodiment includes provisions for the trimming of DC offset and gain to compensate for normal tolerances in the pressure sensor.

Prior to feeding the signal from amplifier 28 to A/D converter 34 the signal is fed to selector switch 30. Selector switch 30 switches the input to A/D converter 34 between barometric pressure setting control 20 and the pressure input signal from amplifier 28.

Immediately after turn-on, for a period of 15 seconds in the preferred embodiment, controller 36 sends a signal to selector switch 30 which selects barometric pressure offset control 20 for continuous display. During this initial period the unit does not measure the air pressure and does not display altitude or vertical speed. The operator set level of pressure offset control 20 is instead displayed on the altitude indicator 14.

During the initial calibration period the operator adjusts control 20 until the know local barometric pressure is indicated on altitude indicator 14. This barometric offset setting is stored in read/write memory 50 and is employed in the adjustment of altitude information by processor 44 and in effect "zeros" the altitude readings so that the derived altitude will be the actual altitude relative to sea level.

After the initial "zero" setting period, while reading air pressure, controller 36 signals selector switch 30 at regular intervals to sample control 20 to determine if there has been an operator adjustment and to modify the altitude display according. This repetative checking of air pressure and barometric offset setting provides the operator with the option of waiting for the initial "zero" setting period to elapse and for the instrument to change to the display of altitude, and to then adjust control 20 to give a reading of the altitude of the site at which the aircraft is located.

It is also possible to adjust control 20 to actually display a zero reading on altitude indicator 14. This method causes the instrument to indicate the altitude above ground level rather than the altitude above sea level as previously described. To assist in setting this zero reading and to obtain readings at elevations below the take off site, the preferred embodiment includes the provision to display altitudes below zero with a clear indication on the display that the altitude is negative and with increasing negative numbers as the altitude decreases.

The unit is turned on by momentary activation of power switch 40. This turns on electronic switch 66 which applies power to the various circuits of the instrument via voltage regulator 60. Controller 36 then provides a signal to electronic switch 66 to hold the power on. The time period of the initial "zero" setting period, which is 15 seconds in the preferred embodiment, begins at the time of turn-on and is controlled by controller 36 which derives the timing information from timer 38.

After the "zero" setting period, instrument 10 goes into its normal operation of altitude display and vertical speed display. In this mode of operation, the measured air pressure from sensor 26, which is stored in read/write memory 50, and the setting of calibration control 20, which is stored in read/write memory 50, are used by processor 44 which converts the data into a suitable signal for display driver 46. Display driver 46 then drives altitude indicator 14, which displays the altitude based on the information originally supplied by sensor 26 as modified by the setting of control 20.

There is, however, some specific signal processing which is performed first. To improve the accuracy of the air pressure signal, two or more readings are taken from A/D converter 34 then these readings are averaged by averager 48. Processor 44, using numerical constants placed in pressure/altitude memory 68 at the time of manufacture, converts the signal from averager 48 to an accurate pressure altitude signal based on a specific altitude versus pressure relationship. This pressure altitude signal, when offset corrected by an amount which is determined by the setting of control 20, is the true altitude value which is then converted to the proper signal to feed display driver 46, which then drives altitude indicator 14.

The vertical speed reading is also derived from the output of averager 48. This consists of storing a first reading of the averaged signal in memory 50, waiting for a specific period of time, storing a second reading, then waiting for the same period again and storing a third reading. These pressure readings are then processed by vertical speed signal processor 51 to obtain the difference in air pressure over a known increment in time. The pressure difference over the known time interval is processed into the numerical equivalent of velocity using constants which are a function of the altitude. These constants are obtained, using the pressure altitude signal from the altimeter portion of the instrument prior to factoring by the operator controlled offset, from a table of values placed into altitude factor memory 69 at the time of manufacture of the instrument. The numerical equivalent of velocity is then converted into the proper signal to display the vertical velocity in appropriate units and is sent to display driver 52, which drives vertical speed indicator 12, to display the vertical speed of the aircraft.

It should be noted that the method employed to obtain vertical speed in the present invention is not the same as is used in most existing electronic vertical speed instruments, that is, it is not an analog differentator. The use of total altitude change occuring over a given interval of time results in an effective averaging of the determined rate, which is usually desirable in powered aircraft. The method used in the present invention is completely free from zero drift, which is a major problem encountered in differentator instruments, where a DC amplifier used with the differentator must have a high gain. The method used in the present invention also makes possible the modification of the sample time according to the flight conditions, If the aircraft is detected, by the instrument, to be in cruising flight as indicated by very small altitude changes over time, the sample period may be made longer to provide more accurate vertical rate information, with less noise due to minor altitude changes. It also becomes possible with this method to average several vertical speed readings prior to display, when the aircraft is determined to be in level flight and then return to a faster updated, non-averaged, reading automatically when the aircraft is being maneuvered.

The switching of sample times and the selection of the proper algorithm to determine the vertical speed of the aircraft from the air pressures measured is a function carried out by interaction of signals between controller 36 and vertical speed signal processor 51, without any input or knowledge of the fact by the operator.

The time between readings of air pressure to be stored for use in calculating vertical speed is set within the preferred embodiment of the invention for 1.875 seconds by timer 54. Timer 54 is also used by controller 36 to initiate the novel energy saving feature of the invention.

Since the vertical speed reading cannot be affected by any altitude readings within the prescribed time period, and since, at normally encountered vertical velocities, an update rate of approximately two seconds is adequate for the altitude information, no air pressure readings are normally taken between those required for obtaining vertical speed, and the time between readings is used as an "off" period for pressure sensor 26 which would otherwise consume the majority of the power of the instrument.

Power is removed from the pressure sensor portion of the circuit by use of power switch 56, which derives its signal from controller 36. Power switch 56 is thereby activated for a short time, approximately nine percent of the 1.875 second time period. During the activated time, at least two readings are taken from sensor 26 via amplifier 28, selector switch 30, and A/D converter 34. Power switch 56 then removes power from sensor 26 and power is restored when the waiting time has elapsed and another set of readings is required. The duty factor of the high power portion of the circuit is therefore dramatically reduced. In the preferred embodiment, the duty factor selected is approximately nine percent. The "on" period must include sufficient time, not only to take at least two consecutive pressure readings, but also to provide a suitable "settling-in" period for the circuits so that no transient effects cause errors in the readings.

The present invention also includes a special feature to indicate battery condition. Rather than the typical low battery indicator light, which merely puts an additional load on the battery and accelerates its failure, the instrument of the present invention is designed to indicate a low battery condition, but also to decrease the battery use to extend its life. This is accomplished by battery monitor 58 which produces an output signal when battery 42 goes below a prescribed voltage. This signal is sent to controller 36 which then suspends all operation of the vertical speed processing system and produces a unique low battery indicating display on vertical speed indicator 12. By suspending the operation of the vertical speed processing, the time between altitude readings may be held at their longest available interval to also minimize power consumption. The preferred embodiment of the invention will continue to provide altitude information for several hours after this power reduction, providing the operator with ample time to replace failing battery 42.

An additional novel battery saving feature of the present invention is the automatic shutdown function. The power from battery 42 is supplied to regulator 60, via electronic switch 66, which is held in the "on" condition by a signal from controller 36. When automatic shutdown circuit 70 detects that there has been no altitude variation beyond a preset value over a specific interval of time, the signal holding electronic switch 66 "on" is changed to an "off" signal and electronic switch 66 switches "off", removing all power from the instrument. Auto shutdown circuit 70 monitors the altitude computed by the altimeter portion of the instrument, and stores it in shutdown memory. On each reading of the altitude information, the new altitude is compared with the altitude stored in shutdown memory 72 and, if different by a given amount, the new altitude is placed in memory 72 and timer 74 is reset. The power is shutdown by deactivating electronic switch 66 if new altitude information has not been entered over the period of time determined by timer 74. In the preferred embodiment of the instrument the time period employed is approximately 15 minutes.

Another feature of the present invention is data receiver 76. This provides a method whereby the local barometric pressure, which, as described in the preceeding description, was obtained manually from control 20, may be information supplied by an external source (not shown) such as a computerized flight director or a receiver system which relays the information from ground based transmitters to aircraft in flight. This automatic data input mode is selectable by use of manual/automatic switch 78. The output devices 80 and 82 are used to provide an output signal representative of the measured altitude or vertical speed to other equipment aboard the aircraft. The signals are derived from the output of the individual signal processors.

The result of the present invention is to provide a compact two-for-one instrument with superior accuracy and reliability and with such low power consumption that a single 9 volt battery of the type used to power transistor radios can power readings of both altitude and vertical speed for up to 50 hours.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention defined in the following claims.

For example, various time periods other than the 15 second initial "zero" setting time and the 1.875 second reading repetition period can be used. In fact, the preferred embodiment actually contains a second timer, and timer 55 is used to provide an alternate period of approximately 0.9 second. Controller 36 automatically switches to this shorter time period when the measured vertical speed surpasses a prescribed limit. In the preferred embodiment this changeover is set at 640 feet per minute. This provision assures that, when vertical speeds are high, readings are available more frequently to prevent the possibility of information being delayed too long for safety.

Moreover, all timing functions could be combined into a single programmable timer which furnishes a variety of timing sequences dependent upon the control signal furnished to it. Also, altitude signal output 80 and vertical speed signal output 82 need not furnish signal similar to that available on the output of their respective signal processors, but can convert the signal to analog, digital, serial or parallel form.

What is claimed as new and desired to be secured by Letters Patent of the United States is:

1. An instrument for determining the altitude of an aircraft comprising:
   pressure sensor means producing an electrical signal varying with the atmospheric pressure to which the instrument is subjected;
   reference voltage means producing a fixed direct current voltage;
   switching means, with two inputs, one connected to the pressure sensor means output and one connected to the reference voltage means output and switching to the reference voltage means input upon a first switching command and to the pressure sensor means input on a second switching command;
   analog to digital converter means connected to the switching means, and converting an analog signal from the switching means to a digital signal output;
   signal processing means connected to the output of the analog to digital converter and modifying the signal to a numerical value representative of an altitude when the signal is from the pressure sensing means and representative of barometric pressure when the signal is from the reference voltage means;
   first display driver means connected to the signal processing means output;
   first digital indicator connected to the output of the display driver and indicating the numerical value of the signal;
   power source connected to and supplying power to the pressure sensor means, the reference voltage means, the switching means, the analog to digital converter means, the signal processing means and all other portions of the instrument requiring electrical power; and
   control means including a first timing means, connected to and controlling the operation of the signal processing means and the switching means, connected to and deriving power from the power source, and sending a first switching command to the switching means upon first receiving power from the power source after being without power, and sending a second switching command to the switching means after a prescribed time period after the first switching command, the time period determined by the first timing means.

2. The instrument of claim 1 further including:
   a power switching means inserted between the power source and the pressure sensor means; and
   a second timing means, controlling the power switching means so that power is supplied to the pressure sensing means only periodically and so that the duty factor of power applied to the pressure sensor means is substantially less than 100 percent.

3. The instrument of claim 2 wherein the second timing means determines a duty factor of less than 10 percent.

4. The instrument of claim 2 wherein the second timing means determines a time period of less than two seconds.

5. The instrument of claim 1 further including an averaging means included in the signal processing means and deriving an average value from at least two consecutive signals from the pressure sensing means prior to any further processing of the signal from the pressure sensing means.

6. The instrument of claim 1 wherein the time period determined by the first timing means is at least fifteen seconds.

7. The instrument of claim 1 further including a vertical speed indicator comprising:
   memory means included in the signal processing means which accepts and stores a first and a second signal from the pressure sensing means and supplies it upon a command;
   vertical speed signal processing means which receives the first and second signals of the pressure sensing means from the memory means and a third signal from the pressure sensing means and processes them to produce a signal of numerical value representative of the vertical speed of an aircraft in which the instrument is located;
   third timing means which determines the time period between the first, second and third signals from the pressure sensing means;
   additional control means providing the command to the memory means to supply the stored signal to the vertical speed signal processing means after a time period following the second signal, the time period determined by the third timing means;
   second digital driver means connected to the output of the vertical speed signal processing means; and second digital indicator means connected to the output of the display driver means and indicating the numerical value of the vertical speed.

8. The instrument of claim 7 further including power source voltage monitor means which produces a command signal when the voltage of the power source falls below a preset value, and additional control means connected to the voltage monitor means, which reduces power consumption of the instrument by removing power from the components of the vertical speed indicator.

9. The instrument of claim 7 further including:
a power switching means inserted between the power source and the pressure sensor means; and
a second timing means, controlling the power switching means so that power is supplied to the pressure sensing means only periodically and so that the duty factor of power applied to the pressure sensor means is substantially less than 100 percent.

10. The instrument of claim 9 wherein the second timing means and the third timing means are the same timing means.

11. The instrument of claim 7 further including a fourth timing means said fourth timing means having a shorter time period than the third timing means, wherein the additional control means switches to the fourth timing means from the third timing means and uses the fourth timing means to control the period between the first, second and third signals when the vertical speed signal surpasses a preset value.

12. The instrument of claim 7 further including, means to compensate the vertical air speed signal for the variation due to altitude.

13. An instrument for determining the altitude of an aircraft comprising:
pressure sensor means producing an electrical signal varying with the atmospheric pressure to which the instrument is subjected;
analog to digital converter deriving signal from the pressure sensor means, and converting an analog signal from the pressure sensor means to a digital signal output, while compensating the output signal proportionally to the setting of the potentiometer;
signal processing means connected to the output of the analog to digital converter and modifying the signal to a numerical value representative of an altitude;
display driver means connected to the signal processing means output;
digital indicator connected to the output of the display driver means and indicating the numerical value of the signal;
power source connected to and supplying power to the pressure sensor means, the analog to digital converter means, the signal processing means and all other portions of the instrument requiring electrical power;
power switching means inserted between the power source and the pressure sensor means; and
first timing means, controlling the power switching means so that power is supplied to the pressure sensing means only periodically and so that the duty factor of power applied to the pressure sensor means is substantially less than 100 percent.

14. The instrument of claim 13 further including an averaging means included in the signal processing means and deriving an average value from at least two consecutive signals from the pressure sensing means prior to any further processing of the signal from the pressure sensing means.

15. The instrument of claim 13 further including a vertical speed indicator comprising:
memory means included in the signal processing means which accepts and stores a first and a second signal from the pressure sensing means and supplies it upon a command;
vertical speed signal processing means which receives the first and second signals of the pressure sensing means from the memory means and a third signal from the pressure sensing means and processes them to produce a signal of numerical value representative of the vertical speed of an aircraft in which the instrument is located;
second timing means which determines the time period between the first, second and third signals from the pressure sensing means;
additional control means providing the command to the memory means to supply the stored signal to the vertical speed signal processing means after a time period following the second signal, the time period determined by the second timing means;
second digital driver means connected to the output of the vertical speed signal processing means; and
second digital indicator means connected to the output of the display driver means and indicating the numerical value of the vertical speed.

16. The instrument of claim 15 further including power source voltage monitor means which produces a command signal when the voltage of the power source falls below a preset value, and control means connected to the voltage monitor means, which reduces power consumption of the instrument by removing power from the components of the vertical speed indicator.

17. The instrument of claim 15 further including a third timing means said third timing means having a shorter time period than the second timing means, wherein the control means switches to the third timing means from the second timing means and uses the third timing means to control the period between the first, second and third signals when the vertical speed signal surpasses a preset value.

18. The instrument of claim 13 wherein the first timing means determines a duty factor of less than 10 percent.

19. The instrument of claim 15 further including, means to compensate the vertical air speed signal for the variation due to altitude.

20. The instrument of claim 13 wherein the first timing means determines a time period of less than two seconds.

21. An instrument for determining the altitude of an aircraft comprising:
pressure sensor means producing an electrical signal varying with the atmospheric pressure to which the instrument is subjected;
reference voltage means producing a fixed direct current voltage;
first switching means, with two inputs, one connected to the pressure sensor means output and one connected to the reference voltage means output and switching between the reference voltage means input and the pressure sensor means input;
analog to digital converter means connected to the switching means, and converting an analog signal from the switching means to a digital signal output;

signal processing means connected to the output of the analog to digital converter and modifying the signal to a numerical value representative of an altitude when the signal is from the pressure sensing means and representative of barometric pressure when the signal is from the reference voltage means;

display driver means connected to the signal processing means output;

digital indicator connected to the output of the display driver means and indicating the numerical value of the signal; and data receiver means receiving information representing a barometric pressure reading and converting the information to an output comparable to that produced by the reference voltage means; and second switching means which switches the reference voltage means input of the first switching means from the reference voltage means output to the data receiver means output.

22. An instrument for determining the vertical speed of an aircraft comprising:

pressure sensor means producing an electrical signal varying with the atmospheric pressure to which the instrument is subjected;

analog to digital converter deriving signal from the pressure sensing means and converting an analog signal from the pressure sensing means to a digital signal output;

altitude signal processing means connected to the output of the analog to digital converter and modifying the signal to a numerical value representative of an altitude;

first memory means which accepts and stores a first and a second signal from the altitude signal processing means and supplies it upon a command;

altitude factor memory means containing a relationship to compensate vertical speed measurements for the altitude at which they are taken;

vertical speed signal processing means which receives the first and second signals of the pressure sensing means from the first memory means, a third signal from the altitude signal processing means and is connected to and uses information from the altitude factor memory means and processes them to produce a signal of numerical value representative of the vertical speed of an aircraft in which the instrument is located and compensated for the altitude at which the aircraft is located;

timing means which determines the time period between the first, second and third signals from the pressure sensing means;

control means providing the command to the first memory means to supply the stored signal to the vertical speed signal processing means after a time period following the second signal, the time period determined by the timing means;

digital driver means connected to the output of the vertical speed signal processing means; and digital indicator means connected to the output of the display driver and indicating the numerical value of the vertical speed.

* * * * *